(12) United States Patent
Fletcher et al.

(10) Patent No.: US 12,523,529 B2
(45) Date of Patent: Jan. 13, 2026

(54) SYSTEM AND METHOD FOR ACTIVE HYPERSPECTRAL IMAGING WITH SUPERCONTINUUM LIGHT

(71) Applicant: CGG SERVICES SAS, Massy (FR)

(72) Inventors: Joe Fletcher, London (GB); Alfred Baines, London (GB); Christoph Andreas Hecker, Enschede (NL); Harald Michael Arnout Van Der Werff, Enschede (NL); Andries Eliza Johannes Botha, Epse (NL); Bruno Virgilio Portela, Enschede (NL); Nils Nicolaas Johannes Evert Nietsch, Enschede (NL)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 18/828,306

(22) Filed: Sep. 9, 2024

(65) Prior Publication Data

US 2025/0003800 A1 Jan. 2, 2025

Related U.S. Application Data

(60) Provisional application No. 63/672,736, filed on Jul. 18, 2024.

(51) Int. Cl.
*G01J 3/02* (2006.01)
*G01J 3/28* (2006.01)

(52) U.S. Cl.
CPC ............ *G01J 3/2823* (2013.01); *G01J 3/0202* (2013.01); *G01J 3/0208* (2013.01); *G01J 3/0291* (2013.01); *G01J 2003/2826* (2013.01)

(58) Field of Classification Search
CPC ...... G01J 3/0291; G01J 3/0208; G01J 3/2823; G01J 2003/2826; B25J 9/026
See application file for complete search history.

(56) References Cited

U.S. PATENT DOCUMENTS 7,126,082 B2   10/2006   Lundberg
9,266,193 B2   2/2016   Liu et al.
(Continued)

FOREIGN PATENT DOCUMENTS

CN   116774243 A      9/2023
JP   H10271864 A  *  10/1998
WO   2023248070 A1   12/2023

OTHER PUBLICATIONS

Keyu Chen, "Powell lens-based line-field spectral domain optical coherence tomography system for cellular resolution imaging of biological tissue", May 2023 (Year: 2023).*

(Continued)

*Primary Examiner* — Maurice C Smith
(74) *Attorney, Agent, or Firm* — PATENT PORTFOLIO BUILDERS PLLC

(57) ABSTRACT

An imaging system includes an imager having first and second light sensors, the first light sensor being configured to record light in a first wavelength range and the second light sensor being configured to record light in a second wavelength range, an alignment mechanism configured to be attached to the imager, an illumination source configured to generate a supercontinuum light beam, and a light shaping mechanism configured to transform the supercontinuum light beam into a linear strip of light. The alignment mechanism is configured to adjust a position of the light shaping mechanism so that a back scattered light, resulting from a scattering of the linear strip of light from a target, has an intensity above a given minimum for each of the first and second light sensors.

20 Claims, 13 Drawing Sheets

(56) References Cited

U.S. PATENT DOCUMENTS

| | | | |
|---|---|---|---|
| 11,069,082 B1* | 7/2021 | Ebrahimi Afrouzi | H04N 23/56 |
| 11,959,801 B2 | 4/2024 | Coward et al. | |
| 2010/0056928 A1 | 3/2010 | Zuzak et al. | |
| 2019/0222751 A1* | 7/2019 | Horita | H04N 13/239 |
| 2020/0021780 A1* | 1/2020 | Jeong | G06T 7/70 |
| 2020/0264047 A1 | 8/2020 | Coward et al. | |

OTHER PUBLICATIONS

Bruce E. Bernacki et al., "Standoff hyperspectral imaging of explosives residues using broadly tunable external cavity quantum cascade laser illumination," Chemical, Biological, Radiological, Nuclear, and Explosives (CBRNE) Sensing XI, 2010, Proc. of SPIE, vol. 7665, pp. 766501-1-766501-10.

I. D. Lindsay et al., "Towards supercontinuum-driven hyperspectral microscopy in the mid-infrared," Optical Biopsy XIV: Toward Real-Time Spectroscopic Imaging and Diagnosis, 2016, Proc. of SPIE, vol. 9703, pp. 970304-1-970304-9.

Jean-Robert Simard et al., "A Range-Gated Intensified Spectrographic Imager: an Instrument for Active Hyperspectral Imaging," In Laser Radar Technology and Applications V, 2000, Proceedings of SPIE, vol. 4035, pp. 180-191.

Bernadette Johnson et al., "A compact, active hyperspectral imaging system for the detection of concealed targets," Part of the SPIE Conference on Detection and Remediation Technologies for Mines and Minelike Targets IV, Orlando, Florida, Apr. 1999, SPIE vol. 3710, pp. 144-153.

Camille-Sophie Bres et al., "Supercontinuum in integrated photonics: Generation, applications, challenges, and perspectives," 2023, Nanophotonics, vol. 12, No. 7, pp. 1199-1244.

Guoqing Zhou et al., "Design of supercontinuum laser hyperspectral light detection and ranging (LiDAR) (SCLaHS LiDAR)," International Journal of Remote Sensing, 2021, vol. 42, No. 10, pp. 3731-3755.

Haibin Sun et al., "Preliminary verification of hyperspectral LiDAR covering VIS-NIR-SWIR used for objects classification," European Journal of Remote Sensing, 2022, vol. 55, No. 1, pp. 291-303.

Joseph Meola et al., "Tower testing of a 64W shortwave infrared supercontinuum laser for use as a hyperspectral imaging illuminator," In: Algorithms and Technologies for Multispectral, Hyperspectral, and Ultraspectral Imagery XX, Jun. 2014, SPIE, vol. 9088, pp. 90881A-1-90881A-12.

Melissa L. Nischan, "Active Spectral Imaging," Lincoln Laboratory Journal, 2003, vol. 14, No. 1, pp. 131-144.

Naoto Yokoya et al., "Detection and Correction of Spectral and Spatial Misregistrations for Hyperspectral Data," International Geoscience and Remote Sensing Symposium (IGARSS), pp. 1003-1006.

Otto Højager Attermann Nielsen et al., "Supercontinuum Light Sources for Hyperspectral Subsurface Laser Scattering Applications for Food Inspection," In: Heyden, A., Kahl, F. (eds) Image Analysis, SCIA 2011, Lecture Notes in Computer Science, vol. 6688, pp. 327-337, Springer, Berlin, Heidelberg.

Pabitro Ray et al., "Supercontinuum-based hyperspectral LiDAR for precision laser scanning," Optics Express, Sep. 2023, vol. 31, No. 20, pp. 33486-33499.

Photonics, N. 2024. SuperK FIANIUM—NKT Photonics nktphotonics. com/products/supercontinuum-white-light-lasers/superk-fianium, 9 pages.

Sebastian Primpke at al., "Rapid Identification and Quantification of Microplastics in the Environment by Quantum Cascade Laser-Based Hyperspectral Infrared Chemical Imaging," Environmental Science and Technology, 2020, vol. 54, pp. 15893-15903.

Search Report dated Apr. 25, 2025 in related/corresponding EP Application No. 24207058.9.

Partial Search Report dated Mar. 17, 2025 in related/corresponding EP Application No. 24207058.9.

Zhongyuan Guo et al., "Active hyperspectral imaging with a supercontinuum laser source in the dark", Chinese Physics B, Mar. 1, 2019, vol. 28, No. 3, pp. 034206-1-034206-6.

Office Action dated Nov. 19, 2024 in related/corresponding AU Application No. 2024227037.

\* cited by examiner

SYSTEM AND METHOD FOR ACTIVE HYPERSPECTRAL IMAGING WITH SUPERCONTINUUM LIGHT

BACKGROUND OF THE INVENTION

Technical Field

Embodiments of the subject matter disclosed herein generally relate to a system and method for remotely identifying various materials from a scene, and more particularly, to a system that may be used in a mining environment for distinguishing between resources and waste using a hyperspectral imaging system with supercontinuum light, which can operate under low illumination conditions.

Discussion of the Background

There are many industries in which a desired material is embedded or mixed or contaminated with undesired materials and there is a need to separate the desired material from the undesired materials. For example, the mining sector extracts iron ore which includes iron (in various forms), which is the desired material. The same iron ore includes phosphorous, sulfur, silica, potassium, sodium, lead, arsenic, etc., which are the undesired materials. Other ore types have similar undesirable constituents. These industries use various methods for determining the composition of the ore on the spot, for example, in the mine, or as the ore is moving on a conveyor system from the mine to a storage and/or processing facility.

One such method (which is reliable and used in the field) for determining the composition of the ore is the X-ray fluorescence (XRF) method, which can measure the elemental composition of the ore constituents during the mining process. However, as noted in [1], this method is limited in terms of its sensing, output, and requires the mounting of sensors on various mining equipment.

Hyperspectral imaging has emerged as a technique for capturing data to create rich images of the ore, much like traditional photography but detecting electromagnetic at continuous (equally spaced) and contiguous (overlapping) wavelengths. However, unlike the conventional methods, hyperspectral imaging gathers electromagnetic data across both visible and invisible ranges. By examining the light detected at different wavelengths, unique spectral signatures of various substances of the target object or scene can be identified. This method allows for the classification of materials such as rocks and minerals by analysing their spectral signatures across the electromagnetic spectrum. This spectral classification of rocks and minerals can be used to provide exploration insights and operational efficiency for the mining industry and various other industries.

Effective hyperspectral imaging relies on a broadband illumination source 110 (see FIG. 1A), usually natural sunlight, for passive imaging of an object 112. A light sensor 114 is used for capturing the light reflected off the object 112. If sunlight is unavailable, artificial light generated by a man-made source 111 (see FIG. 1B) is projected on the object 112 and the reflected light is then recorded with the light sensor 114. This configuration is known as active imaging.

Under controlled conditions (i.e., using the man-made light source), hyperspectral imaging can produce consistent, digital, and quantitative material classification of rocks and minerals. When implemented in mining, material classification using hyperspectral imaging can replace or complement analogue human mapping and logging activities and allow reduced human exposure to unstable rock walls. The maps generated by this approach can be correlated to ore and waste or highlight deleterious mineral contents to significantly increase ore production and reduce waste throughput to the mill. This can increase profit margins and reduce the excess production of waste and tailings materials stored in dedicated management facilities, a leading concern for the mining industry.

Reliance on solar illumination for passive imaging has well-known and documented limitations. For effective data collection, it is constrained to fair weather daytime conditions, requires peak solar angles to avoid shading, and demands high radiance on the target. These constraints significantly limit the use of passive hyperspectral imaging in mining applications, where operations run twenty-four hours a day, and dust and darkness pose constant challenges, such as in underground operations, on shaded rock faces in open pits, stockpiles, blast piles, and on conveyor belts. This underscores the need for alternative, more versatile imaging methods for mining applications.

Active spectral imaging addresses some of the significant challenges associated with solar illumination. By placing the active illumination source at a fixed position relative to a sensor platform, variations in illumination angles are minimized and the spectral power distribution can be better controlled. This enables imaging at any time, above or below surface, reduces shadow effects, and therefore enhances the accuracy of material classification based on derived reflectance spectra. However, it is noted that active spectral imaging also has mining application limitations, which depend on the used illumination source.

If the active source 111 is a halogen illumination sources, which provides broadband illumination at close range, these sources are limited to a few meters range of action for material classification. Typically, halogen floodlights provide uniform, but close-range illumination, and halogen spotlights allow further-range but irregular illumination. These constraints restrict their use in hyperspectral imaging for mining applications beyond near-range use cases, like laboratory setups. Moreover, for rock wall imaging in mine sites, halogen lights are fragile, have limited lifespans, generate heat (a safety concern), and consume significantly more energy than non-incandescent sources, so they require large and mobile power generators to be available beyond mains electrical distribution points.

Light emitting diodes (LEDs), xenon, high-pressure mercury, and metal halides are potential illumination solutions that overcome the above noted limitations of the halogen lights. However, these light sources occupy a narrow band of spectral wavelengths, as schematically illustrated in FIG. 2, thus limiting their use for most geological material classification uses.

Thus, there is a need for a new system that is capable of accurately imaging various materials at distances larger than the traditional close-range distance and in low light illumination conditions, to overcome the limitations discussed above.

SUMMARY OF THE INVENTION

According to an embodiment, there is an imaging system that includes an imager having first and second light sensors, the first light sensor being configured to record light in a first wavelength range and the second light sensor being configured to record light in a second wavelength range, different from the first wavelength range, an alignment mechanism configured to be attached to the imager, an illumination source configured to generate a supercontinuum light beam, and a light shaping mechanism configured to transform the supercontinuum light beam into a linear strip of light, the light shaping mechanism being attached to the alignment mechanism. The alignment mechanism is configured to adjust a position of the light shaping mechanism so that a back scattered light, resulting from a scattering of the linear strip of light from a target, has an intensity above a given minimum for each of the first and second light sensors.

According to another embodiment, there is an alignment mechanism for an active hyperspectral imaging system that uses a supercontinuum laser, and the alignment mechanism includes a frame, a first horizontal rail attached to the frame, a second horizontal rail attached to the frame, a first alignment device movably attached to the first horizontal rail, a second alignment device movably attached to the second horizontal rail, a support track attached with a first end to the first alignment device and with a second end to the second alignment device, a collimator sleeve rotatably attached to the support track and configured to receive a collimator and a light shaping mechanism, and a rotational mechanism configured to rotate the collimator sleeve relative to the support track. The first alignment device is configured to move independent of the second alignment device.

According to yet another embodiment, there is a method for aligning an emitted light of an illumination source with a back scattered light received from a target. The method includes generating a supercontinuum light beam with a supercontinuum laser, transforming the supercontinuum light beam into a linear strip of light with a Powell lens and projecting the linear strip of light onto the target, recording, with an imager, back scattered light from the target, which is a reflection or transmission of the linear strip of light on the target, wherein the imager rotates to scan the entire target, adjusting a position of the Powell lens with an alignment mechanism so that a highest light intensity of the back scattered light is recorded by the imager as the imager rotates, and identifying a material composition of the target based on a spectral signature obtained from the recorded back scattered light.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to imager having two different light sensors. However, the embodiments to be discussed next are not limited to such imager, but may be applied to other imager types.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, an imaging system uses a supercontinuum light beam to illuminate a scene and a hyperspectral imaging device (e.g., a hyperspectral camera) for capturing the back scattered light, which is used by a processing device for identifying the material composition of the scene, for rapid scene acquisitions even in dark and dusty conditions.

Figure 1A:
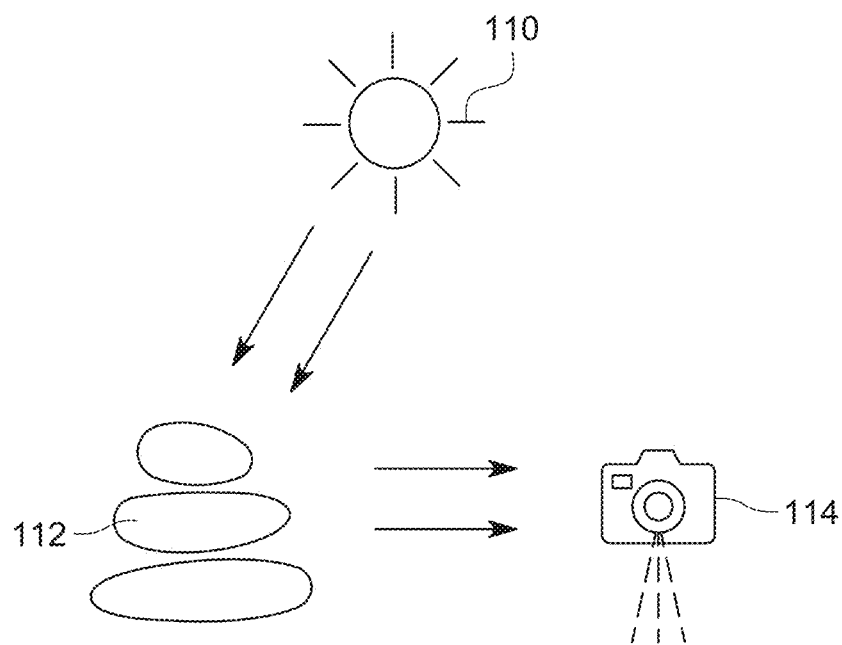
FIG. 1A is a schematic diagram of a passive spectral imaging system and FIG. 1B is a schematic diagram of an active spectral imaging system.
Figure 1B:
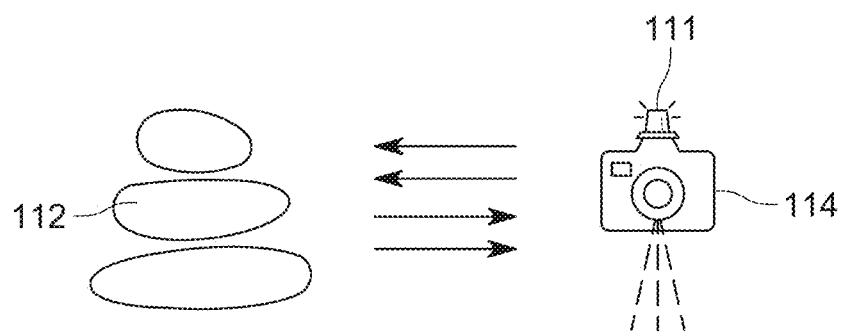
Figure 2:
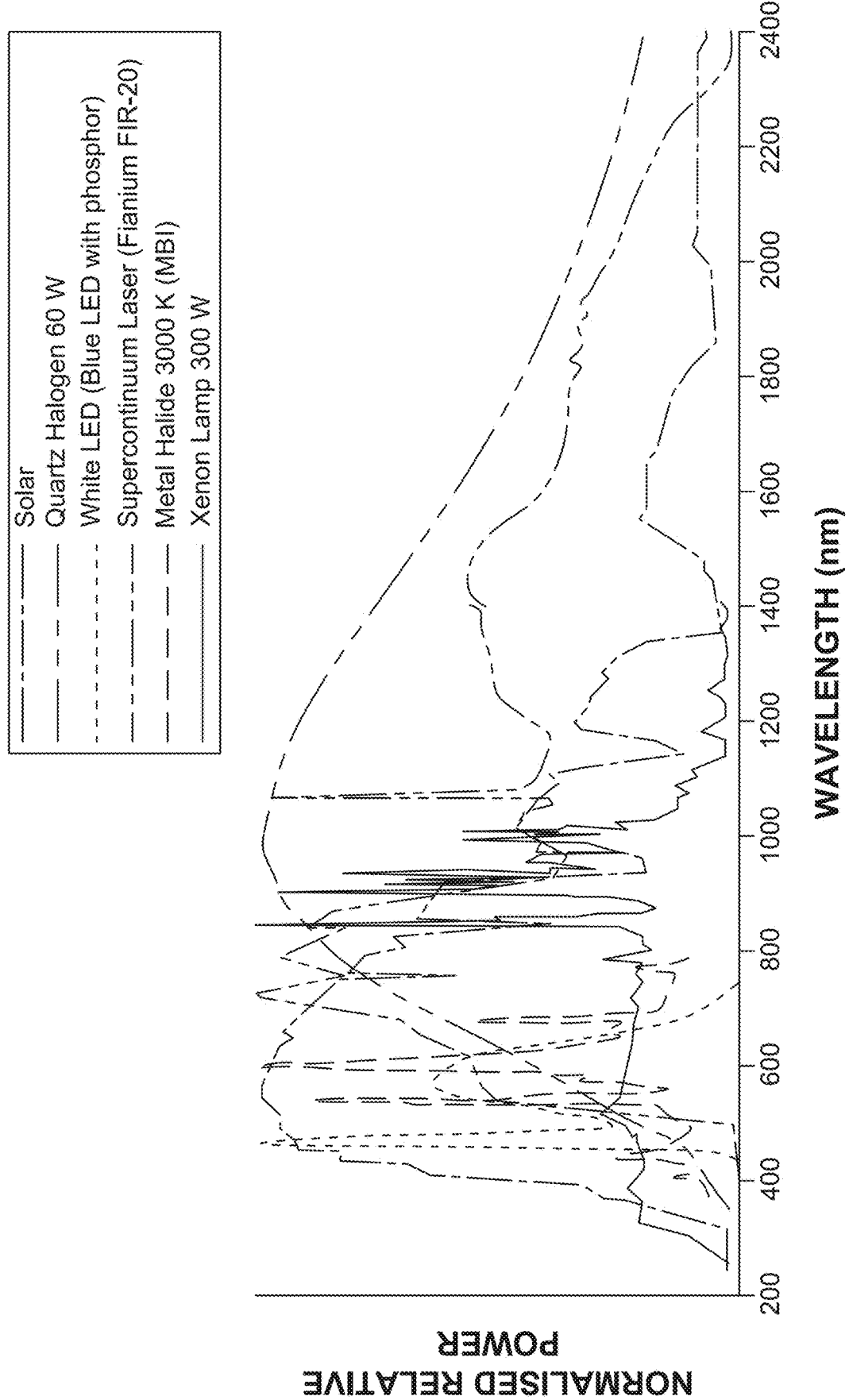
FIG. 2 illustrates a comparison of various light source wavelength distributions.

In contrast to the traditional methods, when safely controlled by the operator, active hyperspectral imaging with a supercontinuum laser offers a more practical solution for mining-related imaging scenarios as it provides a bright, long-life, low-temperature, and energy-efficient broadband illumination, as illustrated in FIG. 2. Active control of the supercontinuum light means scattering caused by dust can be removed to obtain a clear image of objects obscured by the dust or other atmospheric particles (smoke/fog/particulates).

A method that combines supercontinuum lasers with hyperspectral imaging for mining applications provides broadband illumination and hyperspectral imaging capabilities that can be attached to a mobile or fixed equipment platform in mining environments. Such an imaging system enables rapid scene acquisition even in dark and dusty conditions, with the capability to image near and distant targets such as rock walls or mine faces. By analysing spectral signatures across hundreds of electromagnetic energy bands, and with additional laser polarization and fluorescence measurements, it becomes feasible to discreetly differentiate various materials of the scene, with a high degree of accuracy and precision. This, in turn, yields valuable geological and mining insights, leading to increased ore production and reduced waste throughput to the mill. Furthermore, this system when mounted on mobile platforms offers the potential for remote geological mapping tasks currently performed by humans in potentially hazardous environments, such as mines.

According to an embodiment, an active hyperspectral imaging system includes an illumination source that generates a supercontinuum light beam. The illumination source is configured to align the illumination light with a scanner for imaging. This allows for accurate and repeatable scanning and material characterization of a subject up to 20 m away from the imaging system. While active hyperspectral imaging has been paired with supercontinuum lasers, it was mostly employed for detection spectroscopy or ranging and not true imaging, thus limiting its use for rock wall or target material scanning and classification.

For example, the authors in [2] discloses the use of supercontinuum (SC) lasers and various devices that may generate the SC spectrum. These authors also explore various applications of chip-based SC, e.g., metrology, pulse compression, and spectroscopy. Other authors [3-11] presented proof of concept, lab, or field experiments of SC lasers in applications such as defence, biomedicine, forensics, vegetation, and agriculture. SC lasers have also been used in multispectral light detection and ranging (LiDAR) [12-14]. These examples typically have a small field of view, such as a spot beam to detect the presence of a substance at a great distance or in microscopy (microscopic or km scale), or use a gated or mirror system. Most of these systems are also constrained to a narrow portion of the available wavelengths of illumination, which was overcome by the more recently developed collimated supercontinuum lasers [15].

Robust pre-processing of hyperspectral data is typically needed for target imaging applications, to account for variations in illumination, source-surface-sensor angles and distance, sensor temperature and more. The raw data output by a hyperspectral sensor is in units of sensor-specific digital number (DN) values and can contain spectral and spatial distortions such as the smile and keystone effects respectively (see discussion in [16] about these effects). Sensor specific algorithms are applied to convert DN values to radiance values, which may be further corrected to reflectance values, and smile and keystone corrections can also be applied. Hyperspectral data can also contain noise that can be reduced through pre-processing. Both de-striping and cross track corrections can be applied to remove these effects from imagery. The extent of pre-processing required depends, among other things, on illumination conditions, the sensor, and the target identification algorithm. LiDAR can be commonly used alongside hyperspectral for geospatial accuracy. An active hyperspectral (AHS) imaging system that uses an SC source disclosed in the following embodiments resolves these pre-processing challenges for an active illumination source from a supercontinuum laser.

According to an embodiment, the AHS imaging system (simply called herein "an imaging system") with an SC source enables and optimizes efficient, high-resolution active hyperspectral imaging of rock faces, rocks on conveyor belts, waste piles, stockpiles, blast piles, and tailings in a mine or other targets within a 0-20 m range (as long as there is some space for illumination and backscatter). The proposed imaging system is adaptable, portable, and acquires artificially lit hyperspectral data to accurately characterize target materials in field environments. The SC source (e.g., SC laser) serves as a controlled source, overcoming power, dust, and darkness limitations. These challenges typically hinder the effective utilization of hyperspectral imaging in mining environments, especially underground ones.

The imaging system is configured to control hyperspectral imaging from push broom or whiskbroom scanners to ensure uniform outputs. An output of the imaging system includes uniform hypercubes that can be utilized alongside other datasets for valuable geological insights for mining applications in dark, poorly lit or dusty environments.

Before discussing the structure of the imaging device in more detail, a brief discussion about hyperspectral imagers is believed to be in order. Hyperspectral (HS) imaging is the simultaneous or sequential acquisition of spatial images in many spectrally contiguous bands, measured from a remotely operated platform. Because of the combined features of imaging and spectroscopy, the HS imaging simultaneously provides the physical and geometrical features of the observed object, i.e., shape, size, color, and also indicates the chemical composition of the object, either elemental or mineralogical. The HS imaging system is capable to acquire a spectral image of the object, which is a stack of images of the same object, each image recorded at a different spectral (narrow) band. Typically, the HS imaging process uses hundreds of contiguous and regularly spaced bands. This means that each pixel in the HS image has a full spectrum, which means that there is a substantial amount of data preserved in the HS images.

Figure 3:
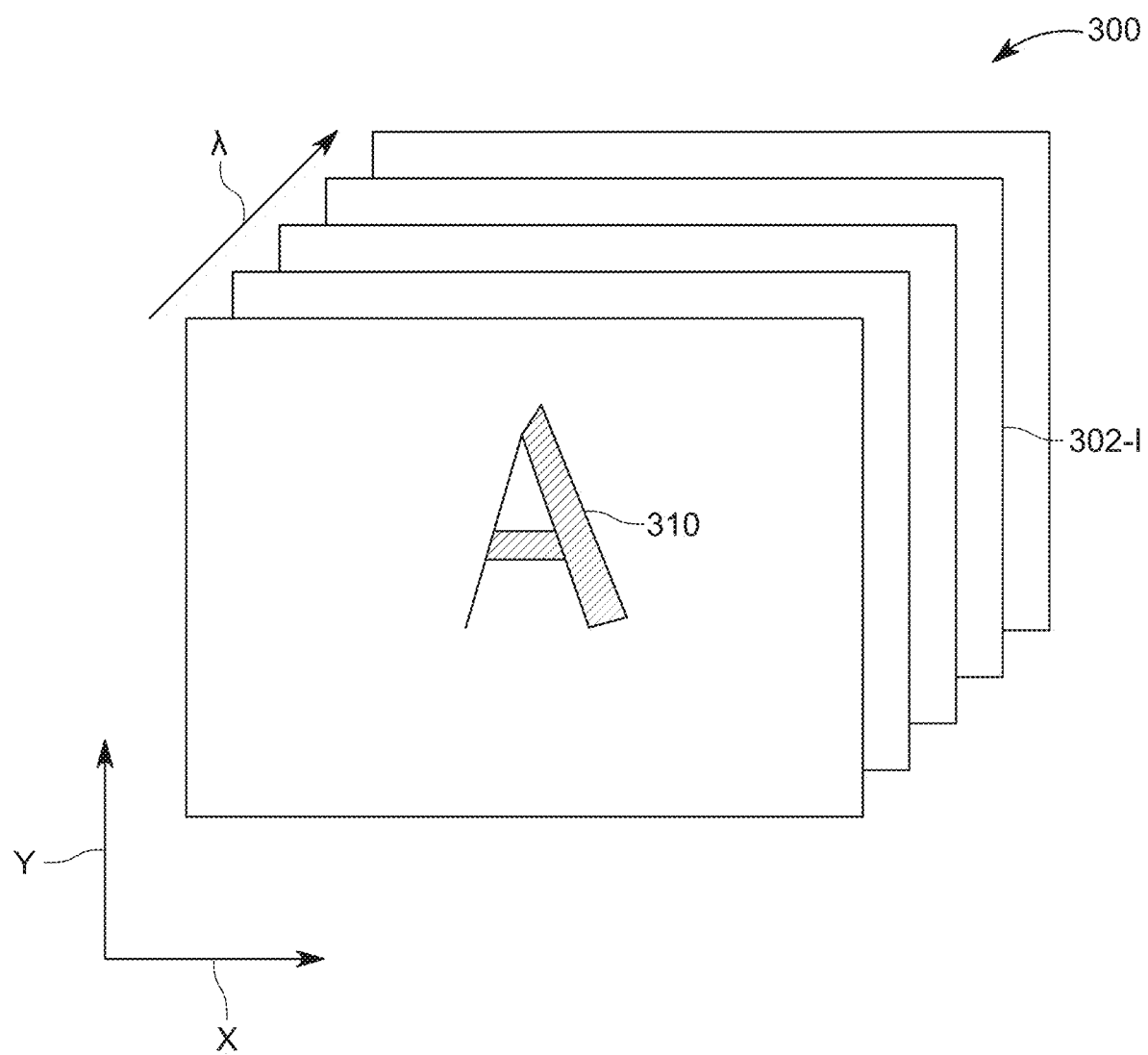
FIG. 3 schematically illustrates a hypercube generated by a hyperspectral imaging device.

An HS image is a three-dimensional (3D) block of data including a stack of two-dimensional images, one behind the other at different wavelengths. The 3D block of data, also called hypercube (see hypercube 300 in FIG. 3), includes two spatial dimensions (x and y) and one spectral dimension (wavelength $\lambda$ along the Z direction). The hypercube 300 essentially includes plural 2D images 302-I of the same object 310, each image 302-I being acquired for a different wavelength. In one embodiment I has a value in the hundreds. The values of light reflectance or absorbance of any pixel for the given wavelength range (i.e., all the wavelengths for which an image is acquired) is called the spectrum.

The HS imaging process works based on the fact that each material has a unique spectral signature or spectral fingerprint. Due to the differences of their chemical compositions and physical structure, various materials reflect, absorb, scatter, and/or emit electromagnetic energy in unique patterns at specific wavelengths. Thus, using the HS images, it is possible to identify the material making up an observed object.

There are various methods for acquiring the HS images, e.g., whiskbroom, push broom, and tunable filter. These methods are also known as point scanning, line scanning, and plane scanning, respectively. The whiskbroom method scans each point of the object and records its full spectrum before moving to the next point. This method thus acquires the full image of the object by adding one point (pixel) after another to the HS image. The push broom method acquires data associated with a line of the object rather than a single pixel and thus, a two-dimensional detector array is used. Note that the whiskbroom method may use a single pixel detector. In practice, the detector may have more pixels. A narrow line of the object for the push broom method is imaged onto a row of pixels on one dimension of the chip and the spectrum for each point is associated with a second dimension of the chip. For the plane scanning method, the image of the entire object is acquired one wavelength at a time, until the entire wavelength range is used up.

Thus, the whiskbroom and push broom methods are similar in the sense that they do not instantaneously image the whole object or scene, but instead they build up the image using localized pixels or lines of pixels as the imager (the camera) moves across the object/scene. An imaging system (which includes the imager) that is configured to achieve both methods (or modes) for a same scene is now discussed.

According to an embodiment, the imaging system uses an SC laser as a light source for illuminating rock faces under field conditions. The imaging system is adaptable, portable, and configured to enable high-resolution active hyperspectral imaging of rock faces, rocks on conveyor belts, waste piles, stockpiles, blast piles, and tailings in mine or field environments. In other words, the imaging system can be moved by a person to a desired place as the system is small and light. The system may be installed in various environments, e.g., in a mine with no illumination, at the surface with ambient light, for acquiring images of a fixed object (e.g., the wall of the mine) or a moving object (e.g., ore moving on a conveyor belt at the surface).

Figure 4A:
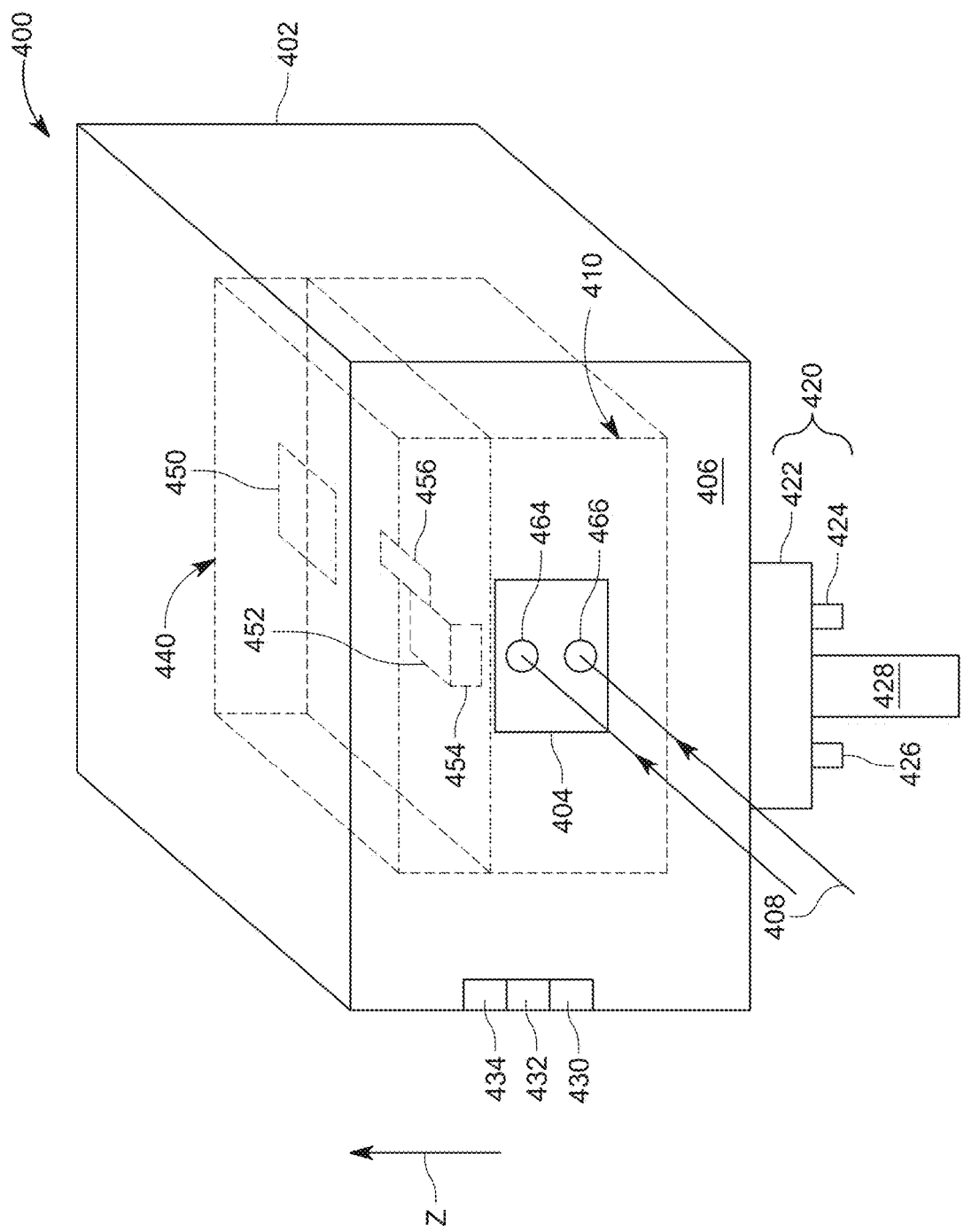
FIG. 4A schematically illustrates an imaging system that uses a hyperspectral camera and a supercontinuum laser source and FIG. 4B illustrates a possible configuration of the hyperspectral camera.

FIG. 4A schematically illustrates the imaging system 400 having a housing 402 that holds inside most (all) of its components. The housing 402 may be made of a metal, plastic, composite material, etc. The housing may have various shapes, e.g., cuboid, cube, sphere, cylinder, pyramid, etc. No matter the shape of the housing 402, it has a window (opening) 404 in one of the faces (if a cuboid or cube) 406 so that outside light 408 can enter inside the enclosure. The window 404 is positioned to allow the incoming outside light 408 to reach an imager 410. The imager 410 is configured to receive the incoming light 408 and transform it into an electrical signal, which is then processed to determine the composition of the object/material that reflected that light.

Figure 4B:
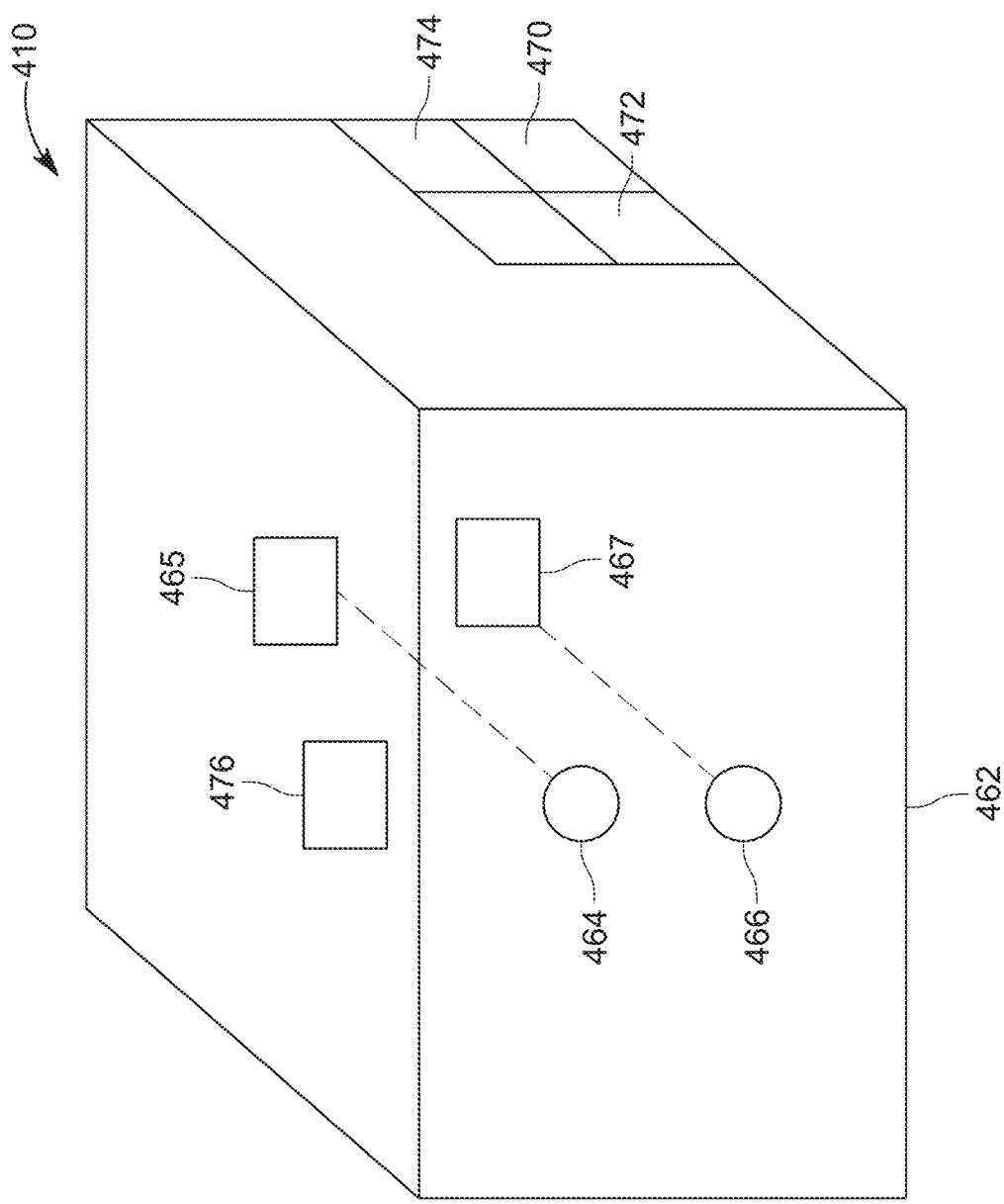

The imager 410 is shown in more detail in FIG. 4B and has a housing 462 with first and second apertures 464 and 466. A first sensor 465 is aligned with the first aperture 464 and a second sensor 467 is aligned with the second aperture 466. The first sensor 465 is configured for the push-broom mode discussed above and the second sensor 467 is configured for the whisk broom mode, also discussed above. In one embodiment, the first sensor 465 is a visible and near infrared (VNIR) sensor with about 1024 spatial pixels and about 200 spectral bands, and the second sensor 467 is a short-wave infrared (SWIR) sensor with about 640 spatial pixels and about 300 spectral bands. Other numbers may be used for the pixels and spectral bands for the imager 410. Note that VNIR includes both the visible light range (approximately 400 to 700 nm) and the near-infrared range (approximately 700 to 1100 nm) while SWIR includes a range from 0.9 to 1.7 micrometers (μm), but can extend from 0.7 to 2.5 μm. In this embodiment, the first sensor is configured to record light with a wavelength between 400 and 1000 nm and the second sensor is configured to record light with a wavelength between 970 and 2500 nm. Other wavelength ranges may also be used.

The imager 410 further includes a processor 470 and a memory 472 which are configured to pre-process the acquired HS images. Optionally, the imager 410 may include a transceiver 474 for communicating with a transceiver 434, associated with a global controller 430 of the imaging system 400, which are discussed later in more detail. The global controller 430 may have a storage device 432 (memory) for storing various instructions to be executed and/or data received from the various elements of the imaging system 400. Note that the imager 410 may also include an internal mirror 476, which moves back and forth, to reflect light from the scene onto the second sensor 467 to image each point of the scene. In other words, the imager 410's internal mirror 476 moves back and forth to collect measurements from one pixel in the scene at a time. A similarity in the sensors 465 and 467 is that they do not instantaneously image the whole scene but instead they build up the image using localized pixels as the imager moves across the scene. Therefore, an illumination source 450, which is shown in FIG. 4A, generates an illumination strip, which is projected onto the scene, and a back scatter light is generated by the scene. The back scattered light is captured by the first and second sensors as the imager 410 moves across the scene.

Returning to FIG. 4A, the imaging system 400 further includes a rotating mechanism 420 attached to an external surface of the housing 402. The rotating mechanism 420 is configured to rotate the housing 402 relative to a vertical axis Z (e.g., gravity) so that the imager 410 can sweep/scan each pixel of a desired target (object or surface) in the scene. The rotating mechanism 420 may include a frame 422 that is attached to the housing 402, a motor 424 for rotating the frame 422 about the axis Z, and a transceiver 426 for communicating with the transceiver 434 and/or other transceivers of the various components of the imager. The rotating mechanism (420) could also be triaxial allowing scans of tunnel walls and ceilings. In this embodiment, the rotating mechanism 420 may be attached to a support mechanism 428, for example, a tripod. In this way, the entire system is portable and can be installed to any desired location. In one embodiment, the rotating mechanism 420 may be attached to another platform instead of the support mechanism 428, for example, a vehicle, airborne device, etc.

The imaging system 400 also includes an alignment mechanism 440 (illustrated in more detail in FIGS. 5A and 5B), which may be mounted on top of the imager 410, as schematically illustrated in FIG. 4A. The alignment mechanism 440 may be fixedly attached to the imager 410, so that both the imager and the alignment mechanism rotate in unison when the rotating mechanism 420 rotates the enclosure 402. Note that the alignment mechanism 440 is fully deployed inside the enclosure 402 in this embodiment. However, in another embodiment, the alignment mechanism 440 may be deployed outside the enclosure 402.

The alignment mechanism 440 is configured to hold an illumination source 450, which generates the SC light, and a light shaping mechanism 452 that shapes the beam generated by the illumination source 450, as discussed later. The illumination source 450 may include an SC laser 560 and an optical fiber 562, which is configured to guide the SC light generated by the SC laser 560 to a collimator 532. Note that the collimator 532 is located within a collimator sleeve 534, which is visible in FIG. 5A. It is noted that an SC laser is different from a traditional laser in the sense that the SC laser uses a collection of nonlinear processes to simultaneously emit plural wavelengths to cause spectral broadening while a traditional laser emits a light beam having essentially a single wavelength. In one application, the SC laser emits SC light in the 390 nm to 2400 nm wavelength range.

Figure 6A:
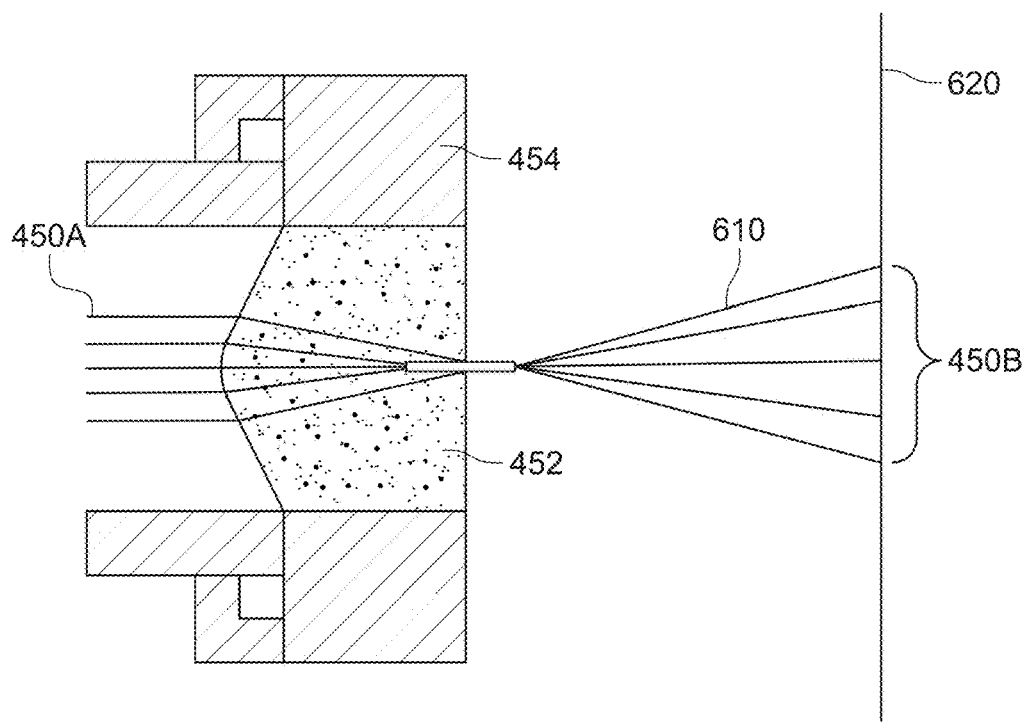
FIGS. 6A and 6B illustrate a light shaping mechanism that transforms a light beam into a linear strip of light.
Figure 6B:
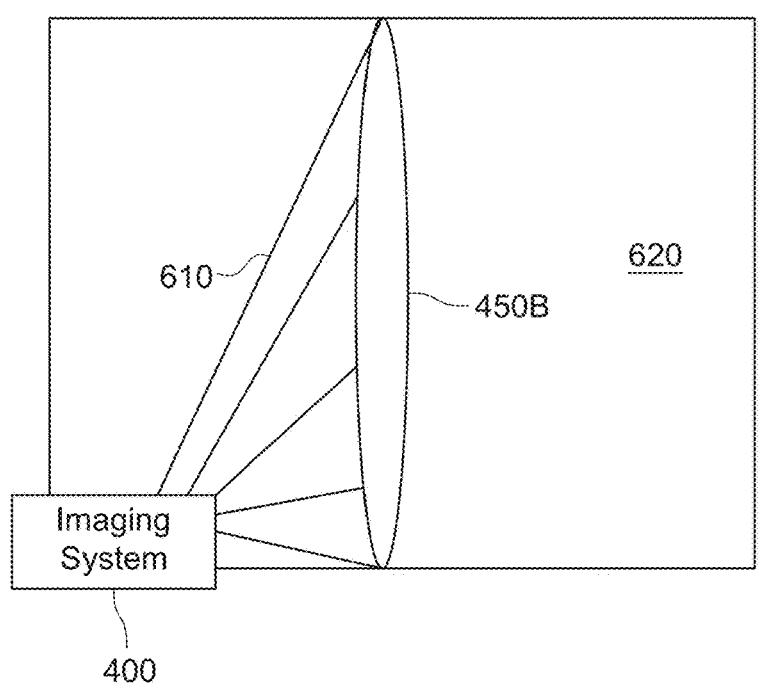

The light shaping mechanism 452, in this embodiment, is a Powell lens. In one application, a 30° Powell lens is used. The Powell lens is known for transforming an optical beam into a thin, vertical line, also called a linear strip of light 610. The light shaping mechanism 452 may be paired with a lens holder 454 (better shown in FIG. 6A), for example, a 1-inch lens holder mounted on a collimator sleeve 456 (to be discussed later), to transform a laser point output 450A of the SC laser 450 into the thin, vertical line (or linear strip) 450B, as illustrated in FIGS. 6A and 6B. FIG. 6A shows that a divergent beam 610 is projected by the light shaping mechanism 452, onto a target 620 (the scene), which may be a wall of a mine. FIG. 6B shows the vertical line of light 610 being projected on the target 620 by the imaging system 400 to form the linear strip of light 450B. Note that the Powell lens may include optical materials that allow VNIR and SWIR wavelengths to be transmitted from the source and the back scattered light by the target to be uniform.

Figure 5A:
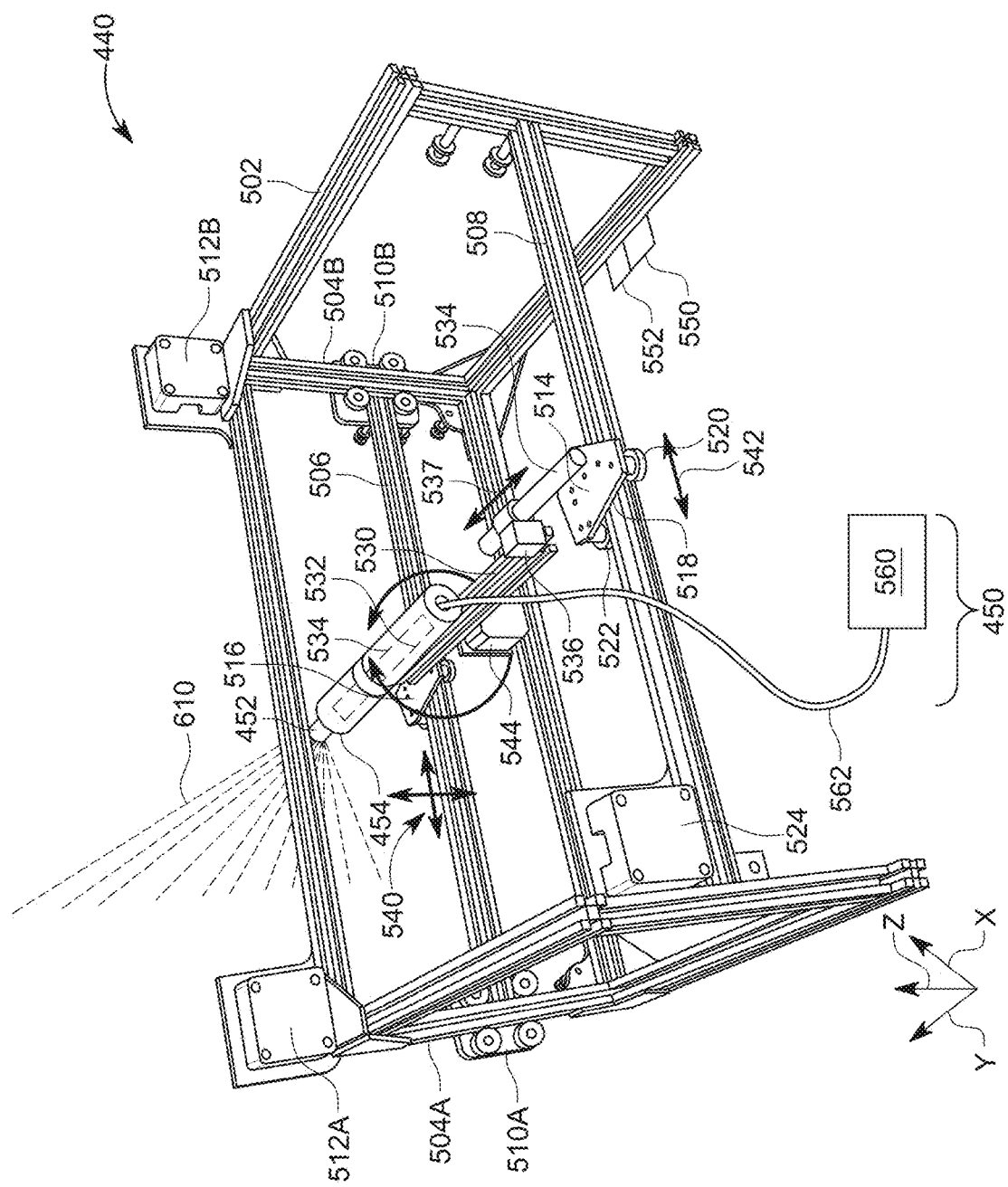
FIG. 5A schematically illustrates an alignment mechanism used by the imaging system of FIG. 4A and FIG. 5B schematically illustrates another alignment mechanism used by the imaging system of FIG. 4A.

FIG. 5A shows one implementation of the alignment mechanism 440 having a frame 502 that includes vertical rails 504A, 504B and horizontal rails 506 and 508. Horizontal rail 506 is movably attached to the vertical rails 504A and 504B, with corresponding sliding mechanisms 510A and 510B (e.g., a supporting plate and corresponding wheels and a motor), for moving the horizontal rail 506 vertically up or down, as desired. In one application, the rails have indents (or grooves) and the wheels have projecting parts that engage the indents. Other mechanisms for mating the wheels to the rails may be used. The sliding mechanisms 510A and 510B are actuated by corresponding actuating mechanisms 512A and 512B, for example, electrical motors. The global controller 430 (shown in FIG. 4A) is configured to control the actuating mechanisms 512A and 512B to move the horizontal rail 506 up and down with a desired amount. The other horizontal rail 508 is fixedly attached to the frame 502.

The alignment mechanism 440 further includes a laser mount and back-scatter alignment mechanism 514 (called herein a first alignment device) and a lens-beam alignment mechanism 516 (called herein a second alignment device). In one embodiment, each of the devices 514 and 516 includes a plate 518 and corresponding wheels 520 (three in this embodiment, but more wheels may be used). A motor 522 may be provided with one of the wheels 520 for rotating the wheel. The wheels are configured to move along the horizontal rail 508 (or horizontal rail 506), when the motor 522 is actuated by an actuating mechanism 524. The actuating mechanism 524 is controlled by the global controller 430. In one embodiment, the actuating mechanisms 512A, 512B, and 524 may provide power to the motors associated with the laser mount and back-scatter alignment mechanism 514 and the lens-beam alignment mechanism 516 and they may also include a transceiver for wireless communication with the global controller 430. Alternatively, the actuating mechanisms are wired to the global controller.

A support track 530 is connected with one end to the lens-beam alignment mechanism 516 and is configured to support the light shaping mechanism 452, the lens holder 454, the collimator 532 and the collimator sleeve 534. In one embodiment, the illumination source 450 is fixedly attached to the alignment mechanism 440. However, the illumination source 450 may be located remote from the alignment mechanism 440. A connecting rod 534 may connect the support track 530 to the first alignment device 514, via a rotatable and sliding junction 536, as illustrated in FIG. 5A. The junction 536 is configured to be fixedly attached to the support track 530 and to be able to rotate relative to the connecting rod 534. Also, the junction 536 is configured to move back and forth, as indicated by arrow 537, relative to the connecting rod 534. This may be achieved by having a magnetic part in both the junction 536 and the connecting rod 534 so that they can slide or rotate relative to each other without losing their grip to each other. In one embodiment, the support track 530 may directly connect to the first alignment device 514.

Because of the moving horizontal rail 506, the second alignment device 516 may move up and down and left and right, as indicated by arrows 540 in FIG. 5A. The first alignment device 514 may move left and right as indicated by arrows 542, but not up and down. The supporting rail 530 may allow the sleeve 534 to rotate about the Y axis, due to a rotational mechanism 544. This rotation motion and the details of the rotational mechanism 544 are discussed later with regard to FIG. 5B. The alignment mechanism 440 may also include a power source 550 (e.g., a battery or any other energy storage device) for powering the various motors discussed above and the communication between the various elements. The alignment mechanism 440 may also include a modem and router 552 for wired or wireless communication between the various elements.

Figure 5B:
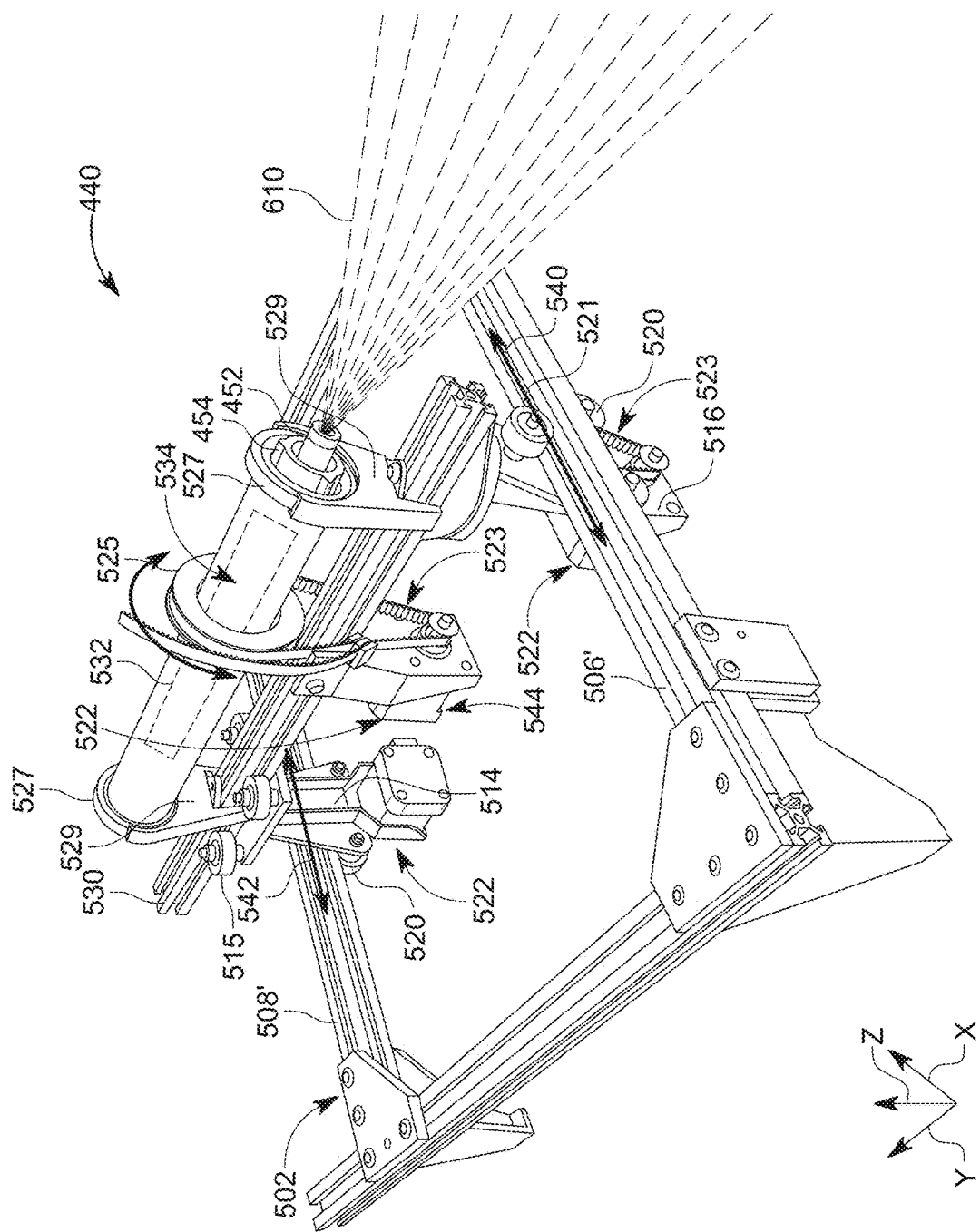

FIG. 5B illustrates another possible implementation of the alignment mechanism 440. For this embodiment, the frame 502 is fixed, i.e., no rail is moving relative to another one. The frame 502 includes two fixed rails 506' and 508' along which the first and second alignment devices 514 and 516 are configured to move back and forth, as illustrated by arrows 540 and 542. The unison movement of the first and second alignment devices 514 and 516 translate the collimator 532, the collimator sleeve 534, and the light shaping mechanism 452 along a direction perpendicular to the fixed rails 506' and 508', while a movement of only one of the first and second alignment devices, tilts the collimator 532 (and implicit the orientation of the light strip 610) relative to the vertical Z axis. In this embodiment, one end of the support track 530 is attached to the second alignment device 516 so that no translation of this end relative to the alignment device is possible while the other end of the support track 530 is slidably attached to the first alignment device 514, by using additional wheels 515. This allows the first alignment device 514 to move relative to the second alignment device 516, along the X direction in the figure, to tilt the collimator sleeve 534 and the light shaping mechanism 452 relative to the Y direction, for a better alignment with the sensors of the imager 410. In one application, the end of the support track 530 attached to the second alignment device 516 cannot slide relative to it, but it can turn (rotate) relative to the second alignment device 516.

In one implementation, each of the first and second alignment devices 514 and 516 includes an electrical motor 522, and passive wheels 522 that engage the corresponding rail. Each alignment device also includes an active wheel 521, which is activated by the corresponding motor 522, through a mechanical belt 523, so that the active wheel moves along the corresponding rail. The mechanical belt is preferred in this embodiment for the low maintenance and abrasion resistance.

FIG. 5B also shows details of the rotational mechanism 544. The rotational mechanism includes a motor 522 that rotates a corresponding belt 523. This belt 523 rotates a pulley 525 that is fixedly attached to the exterior of the collimator sleeve 534. Each end of the collimator sleeve 534 is provided with a ball bearing 527, which is supported by a bracket 529, which is attached to the support track 530. In this way, the motor 522 rotates the belt 523, which in turn rotates the pulley 525 and implicit the collimator sleeve 534. This means that the light strip 610 is also rotated with a desired angle, e.g., from a vertical orientation to any desired orientation, as the light shaping mechanism 440 rotates in unison with the collimator sleeve 534. The rotation of the light strip 620 is controlled by the global controller 430

Figure 7:
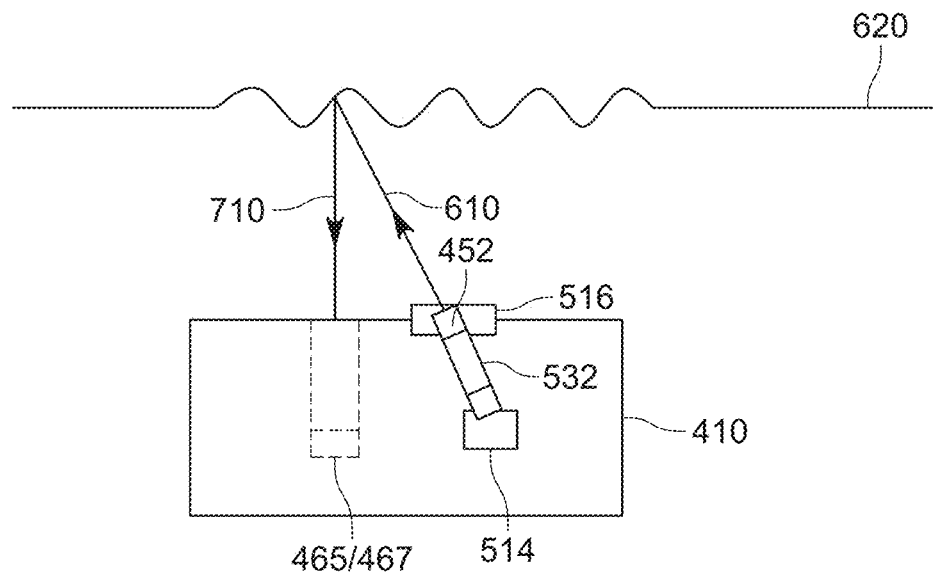
FIGS. 7 and 8 illustrate an alignment procedure of a generated supercontinuum light beam and a back scattered light beam to be recorded by the hyperspectral camera.

Due to the configuration of the alignment mechanism 440 illustrated in FIGS. 5A and 5B, the global controller 430 is able to move the light shaping mechanism 452 relative to the frame 502 and also relative to the imager 410 so that each of the roll, pitch, and yaw of the light strip 610, leaving the system 400, is independently controlled. In this way, the back scattered light beam 710, illustrated in FIG. 7, returning from the target/object/scene 620, and recorded by one of the sensors 465/467 of the imager 410, may be adjusted to have a highest intensity, i.e., to be aligned to the imager's field of view as the imager rotates to build up the image of the target 620. Note that the target 620 may be the wall of the mine, in which case the wall does not extend into a single plane. Because of the irregular shape of the wall 620 (schematically illustrated in FIG. 7), the emitted light 610 is not aligned with the back scattered light 710, i.e., they do not propagate along a same direction. For this reason, an orientation of the light shaping mechanism 452 and collimator 532 need to be adjusted relative to the orientation of the imager 410 to capture the back scattered light 710 having the highest intensity. Note that the orientation of elements 452 and 532 takes place along the direction of the emitted light 610, i.e., the emitted light 610 follows the optical axis of the elements 452 and 532.

Figure 8:
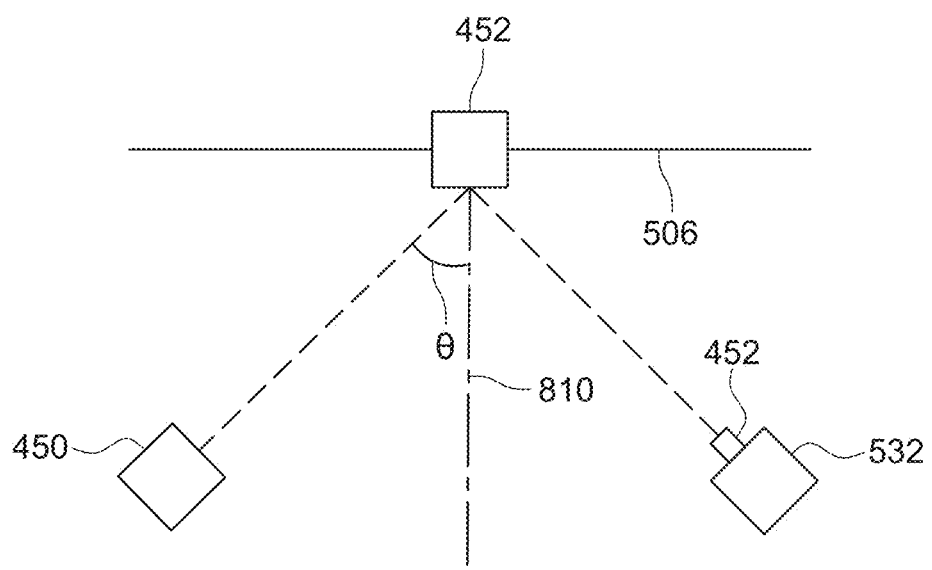

This alignment process may be implemented by independently moving the laser mount and back-scatter alignment mechanism 514 relative to the lens-beam alignment mechanism 516 as now discussed. For example, according to a first method, the imager 410 is fixed and only the orientation of the light shaping mechanism 452 and collimator 532 is modified (between a negative angle and a positive angle as illustrated in FIG. 8), relative to a normal to the rail 506), until the back scattered light 710 has a maximum intensity. Next, both elements 452 and 532 are translated along the direction of rail 506 to determine if there is a better position (i.e., the light 710 intensity further increases). According to a second method, elements 452 and 532 are oriented along the normal 810 and their positions are changed along the rail 506 to determine when the highest intensity of the back scattered light 710 is measured. Then, for the positions where the highest intensity of light 710 is determined, the position of one alignment device (either 514 or 516) attached to element 452 is fixed and the position of the other alignment device is changed to determine if there is a higher light 710 intensity. The other alignment device is then fixed for the highest light 710 intensity. One skilled in the art would understand that other methods may be used for automatically determining the positions of elements 452 and 532 for obtaining the highest intensity light 710. Note that the above methods may be modified to also search for the light 710 highest intensity when element 452 is moved up and down along rails 504A and 504B in FIG. 5A. All these steps may be performed by the global controller 430, as this controller is in communication with all the actuating mechanisms and imager 410, i.e., the global controller receives all the intensity measurements of light 710 and controls all the motors in the system. All these measurements take place for each orientation of the rotating mechanism 420 so that each pixel on the wall 620 is imaged with the highest light intensity.

The global controller 430 rotates the rotating mechanism 420 to move the hyperspectral imager 410 across the entire scene 620, allowing an image to be built. In the dark, without the illumination strip 450B in line with the imager's field of view, the result is a black image as low to no energy (or radiance) from the scene is received by the imager. The alignment mechanism 440 avoids this situation by aligning, for each pixel, the back scattered light 710 with the imager to obtain the highest light intensity. In other words, as the illumination strip 450B is projected on the target scene 620, the resultant back scattered light 710 is automatically and constantly aligned, under the supervision of the global controller 430, with the imager 410's field of view as it builds up the image.

Figure 9:
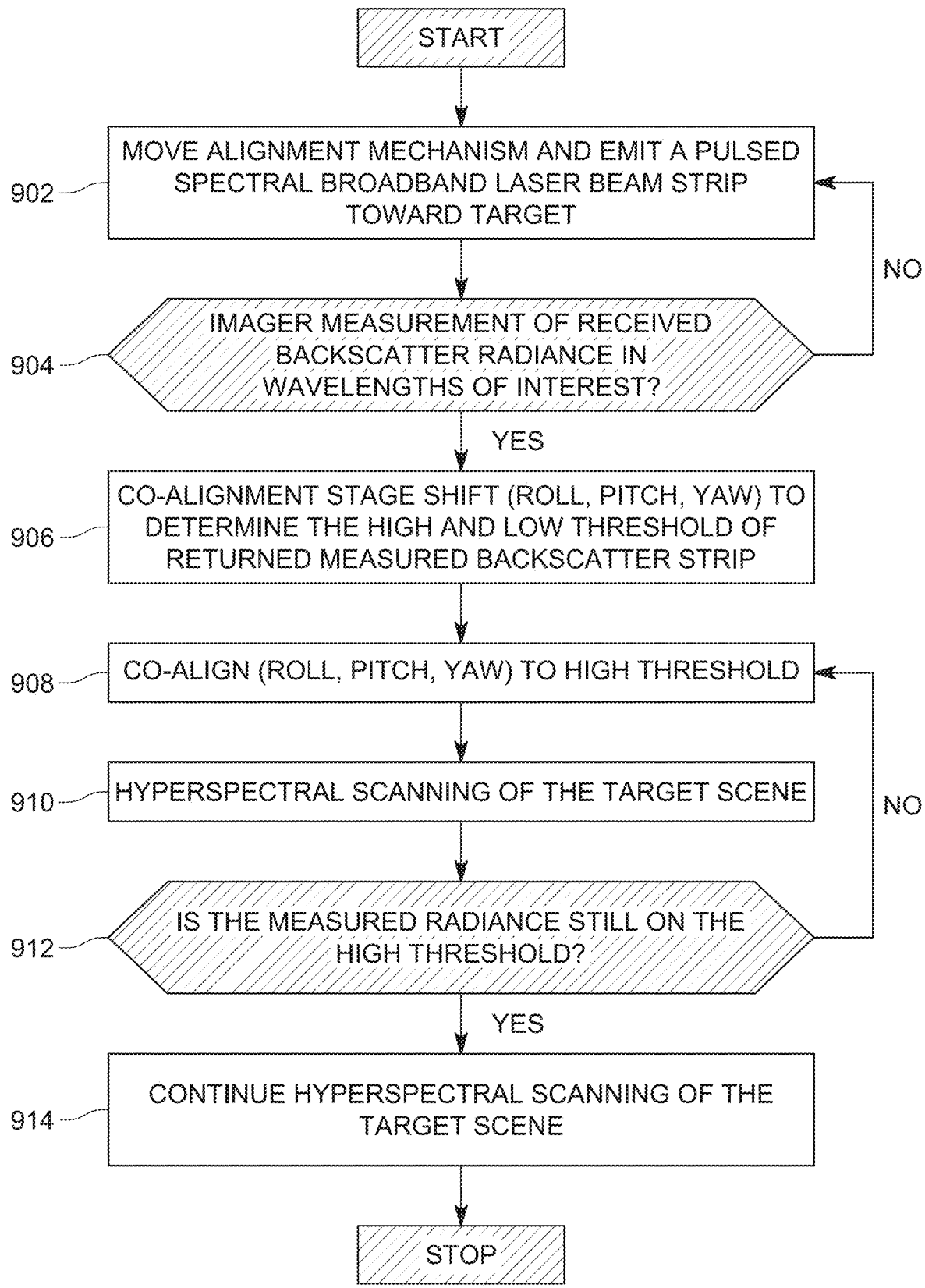
FIG. 9 is a flow chart of a method for the alignment procedure.

In one application, the alignment method, which is schematically illustrated in FIG. 9, starts in step 902 by moving the alignment mechanism 440 (as discussed above) and emitting a pulsed spectral broadband laser beam strip 610 toward the target 620. One or both sensors of the imager 410 record the back scattered light 710 in step 904. If no signal is determined by the imager or the intensity of the recorded signal is small, e.g., below a first threshold established by the operator or above a second threshold, the method returns to step 902. The first and second thresholds are selected based on the maxima and minima in the wavelength of interest (e.g., near infrared (NIR) or SWIR for mineral applications) for each of the two sensors. Note that it is not enough that a light 710 is returned to the imager, that light needs to be in the wavelength range of interest, and thus, step 904 ensures that this is the case. Also note that the maximum light intensity for one sensor is not necessarily aligned with the maximum light intensity for the other sensor of the imager 410. Thus, multiple maxima and minima, one for each sensor is used in this method. For example, if a maximum is obtained for one sensor and not enough light for the other sensor (i.e., below the minimum for the second sensor), the system further adjusts the orientation of the light shaping mechanism and the collimator to obtain a reasonable amount of light for the second sensor (i.e., above the minimum light intensity for this sensor), even if this new position is not achieving the maximum light intensity for the first sensor. In other words, the alignment mechanism is adjusted so that the light intensity for each of the first and second sensors is above a corresponding minimum.

Next, the global controller 430 controls the alignment mechanism 440 to shift (e.g., roll, pitch, and/or yaw) the illumination source (as discussed with regard to FIGS. 7 and 8) to determine the first and second thresholds (which may correspond to high and low thresholds) of the returned measured back scattered light 710, and in step 908 the global controller 430 aligns the alignment mechanism (effectively elements 452 and 532) to the direction corresponding to the highest intensity (if possible, otherwise a direction that achieves light intensities for each of the two lenses above their minima), which is associated with the second or high threshold. This step may be implemented as discussed above with regard to FIGS. 7 and 8. Note that because imager 410 has two different sensors, it is possible to have/determine/consider the maximum backscatter on each sensor (in this example, NIR and SWIR or NIR and VNIR). In practice, because of potential divergence between these values, a "peak" value of the measured back scattered light is defined to be a maximum back scattered value for each lens/sensor and not necessarily only the values received by one single lens/sensor. As discussed above, if a peak for both lenses is not possible to be achieved with a single position of the elements 452 and 532, then the system is configured to find a position where each lens receive a light intensity above the minimum for each lens and below the maximum for each lens. Also note that the measurement unit for the back scattered light is radiance, i.e., the flux emitted, reflected, transmitted, or received by a given surface, per unit solid angle per unit projected area.

Once the position of the high shaping mechanism 452 and collimator 532 are established, the hyperspectral scanning of the target scene is initiated in step 910. This step involves the global controller 430 controlling the rotation mechanism 420 to scan each pixel of the target 620. Also, if the target has a large height (for example, in the order of meters), the global controller may instruct the horizontal rail 506 to move up and down while the other horizontal rail 508 is kept fix (for the implementation of FIG. 5A), so that the pitch of the supporting track 530 changes, i.e., both the bottom and top pixels of the target 620 are illuminated by the emitted beam 610.

As the hyperspectral scanning continues, the method checks (continuously or at certain time intervals) in step 912 whether the measured radiance is still on the high threshold (i.e., the intensity of the measured beam 710 did not decrease below a certain value). If the measured radiance has decreased from the high threshold, the method returns to step 908 to perform a new alignment. If the measured radiance is around the high threshold, the method continues in step 914 with the hyperspectral scanning of the target scene.

Figure 10A:
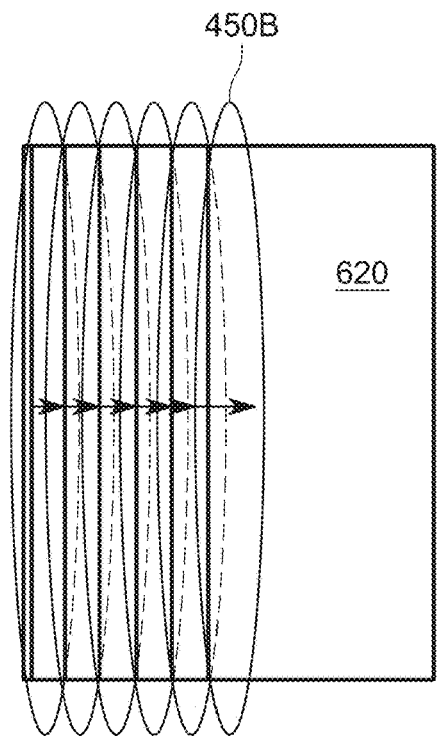
FIGS. 10A and 10B illustrate different light acquisition modes for generating a hyperspectral image with the imaging system of FIG. 4A.
Figure 10B:
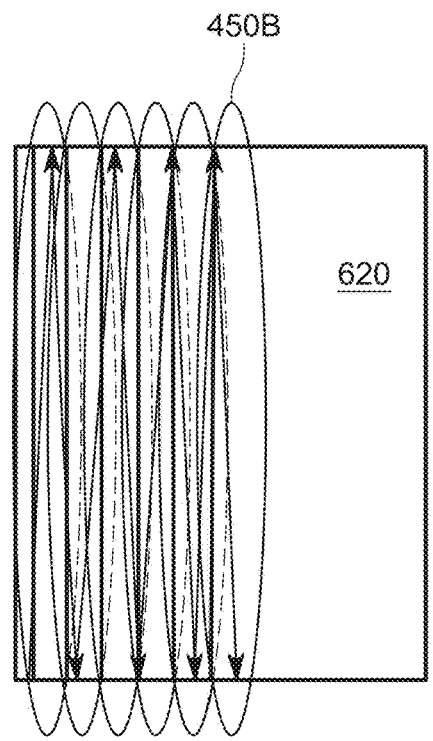

The hyperspectral scanning in steps 910 and 914 includes acquiring data in two modes: a first mode that involves the push broom imaging, as schematically illustrated in FIG. 10A, followed by a second mode that involves whisk broom imaging, as schematically illustrated in FIG. 10B. Note that the pushbroom records light 710 returning from one line of the target 620 while the whisk broom records light 710 returning from one or a couple of pixels of the target 620 as previously discussed.

Figure 11:
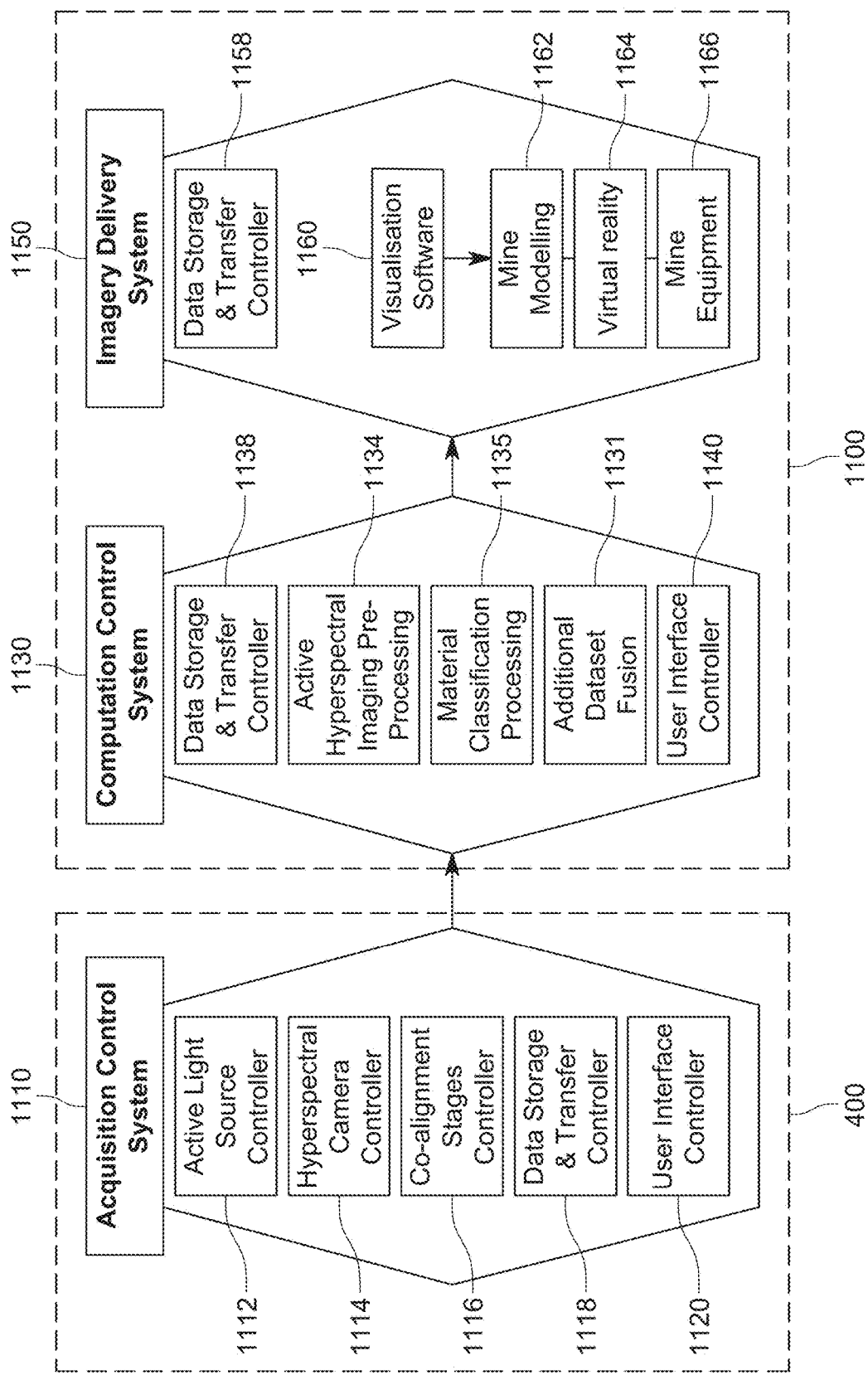
FIG. 11 is a schematic diagram of the imaging system of FIG. 4A and a cloud based imagery delivery system that process the spectral image acquired by the imaging system.

The imaging system 400 may be remotely controlled using wired and wireless connections to a visual interface that controls the running of algorithms to make the system project the illumination source, align with the alignment mechanism 440, and then begin scanning the scene and recording the data with the imager 410. The data collected by the imager 410 may be transferred to a local or cloud-based computational facilities to produce classified material output images in near real-time. In this regard, FIG. 11 schematically illustrates an acquisition control system 1110, which may be implemented in the global controller 430. The acquisition control system 1110 may include an active light source controller 1112, which is configured to control the illumination source 450, for example, a value of the electrical current applied to the SC laser, an amount of time for which the current is on, etc. The system 1110 may further includes a hyperspectral camera controller 1114 that controls the imager 410, for example, when to use sensor 465 and when to use sensor 467, what data to transfer to the global controller 430, etc. The system 1110 may further include a co-alignment controller 1116 to control the movement of each motor of the alignment mechanism 440. The system 1110 may also include a data storage and transfer controller 1118 to control storage device 432. The system 1110 may also include a user interface controller 1120 so that the operator of the system 400 can interact with the system, e.g., input data, or input commands, etc.

The system 400 may interact with a cloud computing system 1100, which is schematically illustrated in FIG. 11. Computing system 1100 may be a personal computer, a laptop, a table, a server, a computer network, etc. Computing system 1100 has a computation control system 1130 that includes various controllers 1134, 1138, and 1140 that communicate with corresponding controllers 1114, 1118, and 1120 of the imaging system 400. In addition, the computer system 1100 may include its own modules, for example, image pre-processing module 1134 for applying various image processing methods to the images acquired by the imager 410, a material classification processing module 1135, which is configured to extract the spectral signature of the various materials from the processed scenes and to identify the material making up the scene/wall/sample/object, and an additional dataset fusion 1131 configure to a database of geospatially or generalized mine datasets related to mine rock material characteristics (spectral/geotechnical/chemical data/assay data).

The computing system 1100 may further include an imagery delivery system 1150 configured to provide images of the processed scenes, identifying the various materials present in the scene. The system 1150 has a data storage and transfer controller 1158 for interfacing with the corresponding modules from the imaging system 400 and the computation control system 1130. The system 1150 further includes a visualization software module 1160 that includes various software for processing the HS images and generating mine modelling 1162, or virtual reality images 1164 of the mine, or mine equipment related images 1166.

The imaging system 400's ability to transfer data to the cloud computing system 1100 opens further possibilities for additional cloud-based processing beyond material classification, for example, a secondary step of fusing hyperspectral and classification rasters with other mine data such as LiDAR, portable X-ray fluorescence (PXRF), laser induced breakdown spectroscopy (PLIBS), engineering, concentrate/metal price, and assay results to help drive ore, waste, deleterious, mineability and other value-based image outputs. The term "mineability" is used in this document to indicate a relative scoring system to determine how desirable a mapped scene is for a certain operation. It is based on mineral characteristics determined by hyperspectral imaging linked to operational considerations—ore mineral distribution, gangue mineral distribution, and deleterious mineral presence and distribution. The scoring utilizes site information and other mine data such as LiDAR, PXRF, PLIBS, engineering, concentrate/metal price, and assay results to help drive not only geological, but ore, waste, deleterious, and value-based image outputs for ore control, geotechnical, and processing decision-making.

The visual outputs could be displayed on screens in mine site vehicles, in augmented/virtual reality (AR/VR), and in mine modelling software (Deswik/MapTek/Leapfrog etc.). The outputs can be geospatially referenced, allowing a time series of developments—4D hyperspectral-based geological, grade, and value estimated outputs for operations.

The use of a modified SC laser allows the illumination source 450 to overcome the power, dust and darkness limitations associated with passive imaging and other active illumination sources. The imaging system 400 allows accurate material characterization of the target 620 in dark conditions up to 20 m away. The imaging system may also include a LIDAR for further geospatial accuracy. The housing 402 allows the entire system to be portable on either a tripod, fixed to mine equipment or vehicular platforms.

Figure 12:
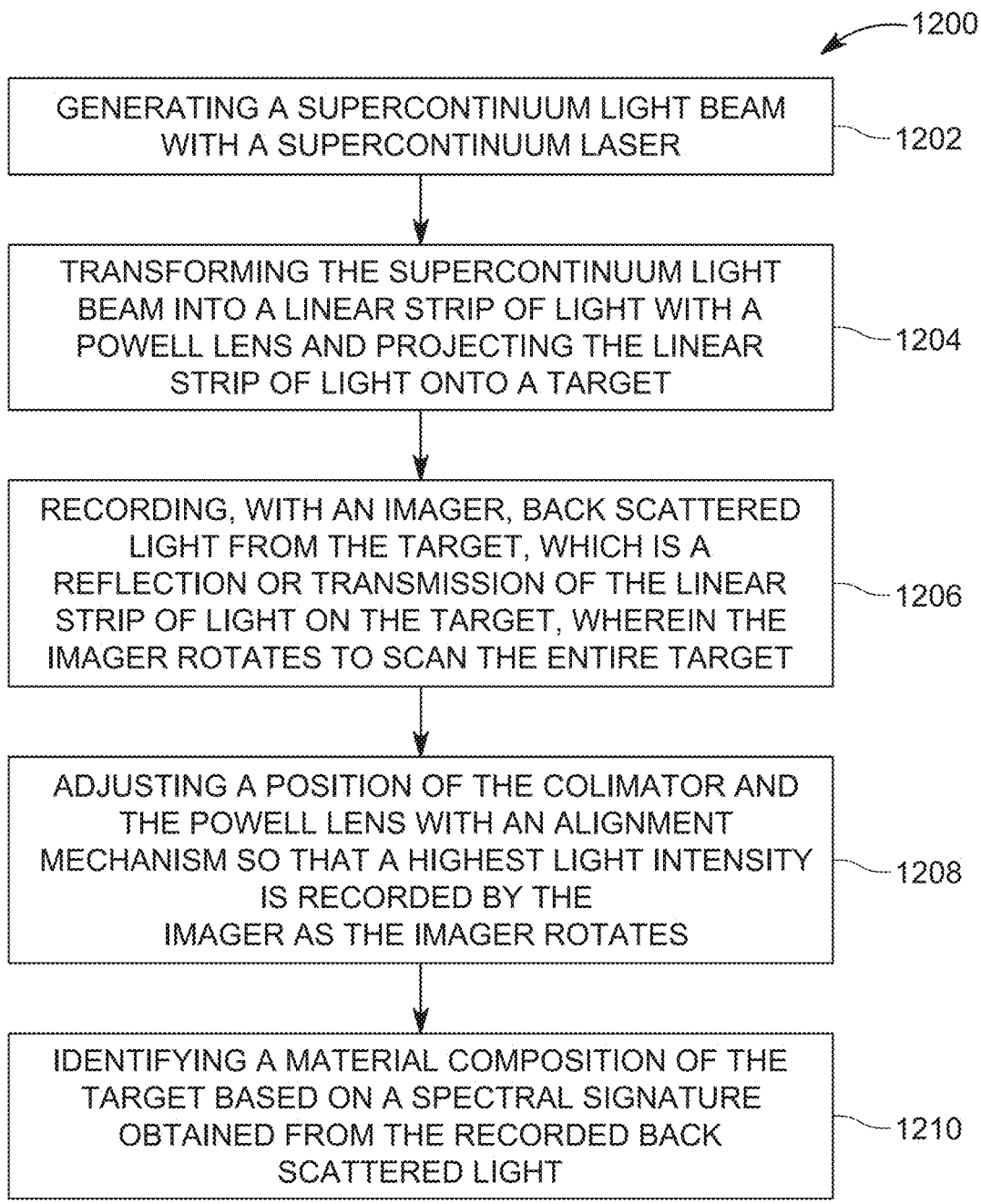
FIG. 12 is a flow chart of a method of determining the material composition of a target using the imaging device of FIG. 4A.

A method for using the imager 410 with the alignment mechanism 440 is now discussed with regard to FIG. 12. FIG. 12 illustrates a method 1200 for aligning an emitted light of an illumination source with a back scattered light received from a target for an active hyperspectral imaging device. The method starts with the step 1202 of generating a supercontinuum light beam with a supercontinuum laser 450, a step 1204 of transforming the supercontinuum light beam into a linear strip of light 450B with a Powell lens 452, and projecting the linear strip of light 450B onto a target 620, a step 1206 of recording 1206, with the imager 410, back scattered light 710 from the target 620, which is a reflection or transmission of the linear strip of light 450B on the target, where the imager 410 rotates to scan the entire target 620, a step 1208 of adjusting a position of the Powell lens and a collimator with an alignment mechanism 440 so that a highest light intensity is recorded by the imager 410 as the imager 410 rotates, and a step 1210 of identifying a material composition of the target 620 based on a spectral signature obtained from the recorded back scattered light 710. The spectral signature is generated line by line or pixel by pixel for the target.

The imaging system 400 has one or more benefits over existing halogen artificial or passive imaging as now discussed. The SC white laser light can be used as an illumination source for scenes within a 0-20 m range. It can be combined and aligned with a hyperspectral system on a rotation stage under field conditions. The resulting images contain spectral information to differentiate key hydrothermal alteration minerals that can be used as a vector to ore or to identify ore and waste minerals.

The alignment mechanism 440 need not be built within the camera unit 410. This technology complements existing hyperspectral camera hardware and scan parameters, where the scanning system rotates to cover a field of view at a defined scan rate. The fact that the alignment mechanism 440 has a triaxial capability (i.e., roll, pitch and yaw adjustments) and the rotating stage (420) could be triaxial allows the system to map tunnels in all dimensions (walls and ceilings).

The alignment mechanism ensures optimal alignment of back scatter light during scanning, compensating for changes in the target distance or 3D geometry that might affect co-alignment. This dynamic system consistently illuminates the imaged scene as the scanning rotation occurs. Moreover, the dynamic system offers the same benefits even when the system remains stationary during scanning and is moved across the target (track acquisition).

The alignment mechanism 440 could be set up to co-align with multiple separate camera systems (across wavelengths in VNIR, SWIR, or thermal infrared (TIR, wavelengths from about 3 to 15 µm)) in the same or separate acquisitions. Other or additional active light sources could be modified to strip light and be used in a similar alignment system; however, as discussed in the background, they have many limitations compared to laser illumination.

The imaging system 400 is portable and has a low power consumption, which allows it to be attached to a tripod, mine equipment, mobile or vehicular platforms.

The imaging system has wireless routers (or transceivers), so it can be remotely operated and controlled, as well as transfer data to be processed locally or in the cloud. This makes it suitable for material characterization in hazardous environments where human safety is at risk.

Control over the illumination source reduces variability between scenes arising from changes in illumination, as well as changes in source-surface-sensor angles.

A local illumination source reduces the impact of absorption by atmospheric gasses and dust, significantly impacting the spectral power distribution of incident light.

Consistent illumination allows semi-automated pre-processing and processing workflows to generate classification maps in real-time. Provided sufficient ground truth data over a given mineral system, consistent imaging conditions may remove the need for white reference panels for calibration between images.

The methods discussed herein may also be applied to the field of subsurface and extraterrestrial exploration, for example, hydrocarbon exploration and development, geothermal exploration and development, and carbon capture and sequestration, or other natural resource exploration and exploitation. They could also be employed for surveying and monitoring for windfarm applications, both onshore and offshore, and also for medical imaging applications.

The term "about" is used in this application to mean a variation of up to 20% of the parameter characterized by this term.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a system for hyperspectral imaging using a supercontinuum light source. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.
[1] International Patent Application Publication WO 2023/248070.
[2] Brès, C. S., Della Torre, A., Grassani, D., Brasch, V., Grillet, C. & Monat, C. 2023. Supercontinuum in integrated photonics: Generation, applications, challenges, and perspectives. *Nanophotonics,* 12, 1199-1244, doi.org/10.1515/nanoph-2022-0749.
[3] Johnson, B., et al. 1999. *A Compact, Active Hyperspectral Imaging System for the Detection of Concealed Targets.*
[4] Simard, J. R. et al., 2000. *A Range-Gated Intensified Spectrographic Imager: An Instrument for Active Hyperspectral Imaging.*
[5] Nischan, M., et al., 2003. Active spectral imaging. *Recommended Citation Lincoln Laboratory Journal,* 14, 131-144.
[6] Bernacki, B. E. and Phillips, M. C. 2010. Standoff hyperspectral imaging of explosives residues using broadly tunable external cavity quantum cascade laser illumination. In: *Chemical, Biological, Radiological, Nuclear, and Explosives (CBRNE) Sensing XI.* SPIE, 766501, doi.org/10.1117/12.849543.
[7] Højager, O., et al. 2011. *Supercontinuum Light Sources for Hyperspectral Subsurface Laser Scattering Applications for Food Inspection.*
[8] Meola, J., et al., 2014. Tower testing of a 64 W shortwave infrared supercontinuum laser for use as a hyperspectral imaging illuminator. In: *Algorithms and Technologies for Multispectral, Hyperspectral, and Ultraspectral Imagery XX.* SPIE, 90881A, doi.org/10.1117/12.2056722.
[9] Lindsay, I. D., et al., 2016. Towards supercontinuum-driven hyperspectral microscopy in the mid-infrared. In: *Optical Biopsy XIV: Toward Real-Time Spectroscopic Imaging and Diagnosis.* SPIE, 970304, doi.org/10.1117/12.2210836.
[10] Primpke, S., at al., 2020. Rapid Identification and Quantification of Microplastics in the Environment by Quantum Cascade Laser-Based Hyperspectral Infrared Chemical Imaging. *Environmental Science and Technology,* 54, 15893-15903, doi.org/10.1021/ACS.EST.0C05722.
[11] Camenzind, S. L., et al., 2023. Supercontinuum-based hyperspectral LiDAR for precision laser scanning. *Optics Express,* Vol. 31, Issue 20, pp. 33486-33499, 31, 33486-33499, doi.org/10.1364/OE.498576.
[12] Zhou, G., et al., 2021. Design of supercontinuum laser hyperspectral light detection and ranging (LiDAR) (SC-LaHS LiDAR). *International Journal of Remote Sensing,* 42, 3731-3755, doi.org/10.1080/01431161.2021.1880662.
[13] Sun, H., et al., 2022. Preliminary verification of hyperspectral LiDAR covering VIS-NIR-SWIR used for objects classification. *European Journal of Remote Sensing,* 55, 291-303, doi.org/10.1080/22797254.2022.2056519.
[14] Qian, L., et al., 2023. Design and demonstration of airborne hyperspectral imaging LiDAR system based on optical fiber array focal plane splitting. *Optics Communications,* 534, 129331, doi.org/10.1016/J.OPTCOM.2023.129331.
[15] Photonics, N. 2024. SuperK FIANIUM-NKT Photonics nktphotonics.com/products/supercontinuum-white-light-lasers/superk-fianium.
[16] Yokoya, N., et al., 2010. Detection and correction of spectral and spatial misregistrations for hyperspectral data. *International Geoscience and Remote Sensing Symposium (IGARSS),* 1003-1006, doi.org/10.1109/IGARSS.2010.5652919.

What is claimed is:

1. An imaging system comprising:
an imager having first and second light sensors, the first light sensor being configured to record light in a first wavelength range and the second light sensor being configured to record light in a second wavelength range, different from the first wavelength range;
an alignment mechanism configured to be attached to the imager;
an illumination source configured to generate a supercontinuum light beam; and
a light shaping mechanism configured to transform the supercontinuum light beam into a linear strip of light, the light shaping mechanism being attached to the alignment mechanism,
wherein the alignment mechanism is configured to adjust a position of the light shaping mechanism so that a back scattered light, resulting from a scattering of the linear strip of light from a target, has an intensity above a given minimum for each of the first and second light sensors.

2. The imaging system of claim 1, wherein the light shaping mechanism is attached to a collimator sleeve, which holds a collimator.

3. The imaging system of claim 2, wherein the collimator sleeve is configured to collimate the supercontinuum light beam before entering the light shaping mechanism, and alignment mechanism is configured to move in unison the collimator sleeve, the collimator, and the light shaping mechanism move relative to the imager.

4. The imaging system of claim 1, wherein the alignment mechanism comprises:
a first alignment device attached to a first horizontal rail of the alignment mechanism, the first alignment device being attached to a support track; and
a second alignment device attached to a second horizontal rail of the alignment mechanism, the second alignment device being attached to the support track.

5. The imaging device of claim 4, wherein the first alignment device includes a motor and wheels to horizontally move along the first horizontal rail, and the second alignment device includes a motor and wheels to horizontally move along the second horizontal rail.

6. The imaging device of claim 5, wherein the second rail has end wheels to vertically move along side rails of the alignment mechanism.

7. The imaging device of claim 5, wherein the alignment mechanism further comprises:
a collimator sleeve rotatably attached to the support track, wherein the light shaping mechanism is attached to one end of the collimator sleeve;
a collimator provided inside the collimator sleeve; and
a rotational mechanism configured to rotate with a belt the collimator sleeve relative to the support track.

8. The imaging device of claim 1, further comprising:
a housing configured to house the imager, the alignment mechanism, the illumination source, and the light shaping mechanism; and a rotating mechanism externally attached to the housing and configured to rotate the housing about a vertical axis.

9. The imaging device of claim 8, further comprising:
a global controller configured to control the imager, the alignment mechanism, the illumination source, and the rotating mechanism so that, as the rotating mechanism rotates the enclosure to build up an image of the target, the alignment mechanism maintains a light intensity of the back scattered light above corresponding minima for the first and second light sensors, by adjusting the position of the light shaping mechanism relative to the imager.

10. The imaging device of claim 1, wherein the imager is an active hyperspectral camera, the illumination source includes a supercontinuum laser, and the light shaping mechanism includes a Powell lens.

11. The imaging device of claim 1, wherein the first wavelength range is about 400 to 1000 nm and the second wavelength range is about 970 to 2500 nm.

12. The imaging system of claim 1, wherein the first light sensor includes an array of sensors distributed in a line and the first light sensor is configured to simultaneously record the back scattered light from a line of pixels while the second light sensor includes a sensor that records the back scattered light from a pixel of the target.

13. An alignment mechanism for an active hyperspectral imaging system that uses a supercontinuum laser, the alignment mechanism comprising:
a frame;
a first horizontal rail attached to the frame;
a second horizontal rail attached to the frame;
a first alignment device movably attached to the first horizontal rail;
a second alignment device movably attached to the second horizontal rail;
a support track attached with a first end to the first alignment device and with a second end to the second alignment device;
a collimator sleeve rotatably attached to the support track and configured to receive a collimator and a light shaping mechanism; and
a rotational mechanism configured to rotate the collimator sleeve relative to the support track,
wherein the first alignment device is configured to move independent of the second alignment device, and
wherein the alignment mechanism is portable.

14. The alignment mechanism of claim 13, wherein the first alignment device includes a motor and wheels to horizontally move along the first horizontal rail, and the second alignment device includes a motor and wheels to horizontally move along the second horizontal rail.

15. The alignment mechanism of claim 14, wherein the second horizontal rail has end wheels to vertically move along side rails of the frame while the first horizontal rail is fixedly attached to the frame.

16. The alignment mechanism of claim 14, wherein the rotational mechanism comprises:
a motor; and
a belt,
wherein the belt is configured to round the collimator sleeve and to rotate the collimator sleeve when engaged by the motor.

17. The alignment mechanism of claim 13, wherein the collimator sleeve has end ball bearings for rotating relative to the support track, and a pulley located on the outside of the collimator sleeve, to engage a belt of the rotational mechanism.

18. The alignment mechanism of claim 13, wherein the rotational mechanism is directly attached to the support track.

19. A method for aligning an emitted light of an illumination source with a back scattered light received from a target, the method comprising:
generating a supercontinuum light beam with a supercontinuum laser;
transforming the supercontinuum light beam into a linear strip of light with a Powell lens and projecting the linear strip of light onto the target;
recording, with an imager, back scattered light from the target, which is a reflection or transmission of the linear strip of light on the target, wherein the imager rotates to scan the entire target;
adjusting a position of the Powell lens with an alignment mechanism so that a highest light intensity of the back scattered light is recorded by the imager as the imager rotates; and
identifying a material composition of the target based on a spectral signature obtained from the recorded back scattered light.

20. The method of claim 19, wherein the spectral signature is generated line by line or pixel by pixel for the target.

* * * * *